(12) United States Patent
Takahashi et al.

(10) Patent No.: US 6,480,671 B2
(45) Date of Patent: *Nov. 12, 2002

(54) VIDEO CAMERA AND RECORDING AND REPRODUCING APPARATUS WHICH COMMUNICATE VIA WIRELESS COMMUNICATION TECHNIQUES

(75) Inventors: Kazuhiro Takahashi, Tokorozawa; Hideyuki Arai, Kawasaki; Hirofumi Takei, Yokohama; Motoi Tariki, Machida; Masamine Maeda, Chiba, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/786,865

(22) Filed: Jan. 23, 1997

(65) Prior Publication Data

US 2001/0043786 A1 Nov. 22, 2001

(30) Foreign Application Priority Data

Jan. 26, 1996 (JP) .............................. 8-011698

(51) Int. Cl.$^7$ ................................................. H04N 5/91
(52) U.S. Cl. ...................................................... 386/117
(58) Field of Search ............................... 386/117, 118, 386/107, 46, 1, 38; 348/211, 723, 722, 222, 724, 212, 38; 358/906; H04N 7/52, 5/225

(56) References Cited

U.S. PATENT DOCUMENTS 5,463,656 A * 10/1995 Polivka et al. .............. 375/200
5,666,159 A * 9/1997 Parulski et al. ............. 186/117

* cited by examiner

Primary Examiner—Robert Chevalier
(74) Attorney, Agent, or Firm—Morgan & Finnegan, L.L.P.

(57) ABSTRACT

A video camera and a recording and reproducing apparatus each comprise a communication circuit arranged to modulate by a spread spectrum communication method a video signal outputted from an image pickup element and transmit the modulated video signal to an external monitor by wireless communication. The video camera and the recording and reproducing apparatus each further comprise a recording and reproducing part for recording and reproducing a video signal outputted from the image pickup element on and from a recording medium, and an arrangement which brings the communication circuit to a transmitting state according to the state of operation of the recording and reproducing part.

12 Claims, 6 Drawing Sheets

VIDEO CAMERA AND RECORDING AND REPRODUCING APPARATUS WHICH COMMUNICATE VIA WIRELESS COMMUNICATION TECHNIQUES

BACKGROUND OF THE INVENTION

1. Field of the Invention

The present invention relates to a video camera and a recording and reproducing apparatus and, more particularly, to a video camera and a recording and reproducing apparatus which communicate signals by using wireless communication techniques.

2. Description of Related Art

Conventionally, if a user desires to enjoy reproduction of a video image, sound and the like recorded during photography with a video camera or a VTR-integrated type video camera, the user connects such apparatus to a television receiver or a monitor display with a cord or the like so that the video image is displayed on its display screen while the sound is being outputted.

Various kinds of techniques which enable communication of a video signal between a plurality of video apparatus by transmitting the video signal by wireless communication have been developed. For example, the technique of transmitting and receiving a video signal and an audio signal by employing frequency-modulated infrared rays has been developed.

However, it has been greatly awkward for general users to connect a plurality of video apparatus with a cord or the like in the conventional way. In addition, a larger number of families have possessed various kinds of video apparatus, with the result that the possibility of causing the problem of erroneous wiring or the like has recently been becoming higher. For these reasons as well, the problem of connection of a plurality of video apparatus is becoming a great problem.

In addition, since photography using a camera-integrated type VTR is commonly performed without the camera-integrated type VTR being connected to another display apparatus, a user must connect it to the display apparatus if the user desires to enjoy reproduction of a video image and the like recorded during the photography. Furthermore, in the case of photography using the camera-integrated type VTR, the user occasionally needs to operate the camera-integrated type VTR or monitor a video image or the like at a remote location even during photography. It is apparent, therefore, that the need for the aforesaid awkward connection using a cord constitutes one disadvantage of this kind of camera-integrated type VTR.

However, if the communication of a video signal and an audio signal between individual video apparatus is to be achieved by using conventional wireless techniques, wireless equipment needs to be prepared separately from the individual video apparatus. For example, in the case of wireless equipment which performs transmission and reception of video signals by using infrared rays, it is necessary to connect transmitting/receiving units to the respective video apparatus, so that the time required for wiring is not reduced compared to the above-described conventional connection. For this reason, it has been difficult to apply apparatus using such wireless techniques to apparatus intended for consumers.

In addition, the wireless techniques using infrared rays have a number of disadvantages such as an insufficient amount of information transmission, degradation of information due to interference, hindrance or the like, restricted directivity, and short transmission distance. Furthermore, this kind of apparatus has another disadvantage of requiring large power consumption for transmission, and if a battery loaded in a portable apparatus, such as a video-camera-integrated type VTR, is used as a power source, the photographing/recording time of such apparatus will become shorter with an increase in power consumption.

It is not desirable for the user to frequently turn on and off the power switch of each of the transmitting/receiving units to extend the photographing/recording time, because photographing operation becomes very complicated. In particular if the user desires to operate the video-camera-integrated type VTR at a remote location, it is substantially impossible to turn on and off the power source of the transmitting/receiving unit secured to the video-camera-integrated type VTR.

BRIEF SUMMARY OF THE INVENTION

An object of the present invention is to solve the above-described problems.

Another object of the present invention is to realize a video camera which has an increased number of uses, a reduced handling complexity, excellent operability, and reduced power consumption.

To achieve the above objects, in accordance with one aspect of the present invention, there is provided a video camera which comprises image pickup means, modulation means for modulating a video signal outputted from the image pickup means, by a spread spectrum communication method, and communication means for transmitting the video signal modulated by the modulation means to an external monitor by wireless communication.

In accordance with another aspect of the present invention, there is provided a video camera which integrally comprises image pickup means, recording means for recording a video signal outputted from the image pickup means on a recording medium, and communication means for transmitting the video signal outputted from the image pickup means to an external side, by wireless communication, the communication means being brought to a transmitting state according to a state of operation of the recording means.

Still another object of the present invention is to realize a recording and reproducing apparatus which has an increased number of uses, a reduced handling complexity, and the ability to transmit a larger amount of information than the amount of information which can be transmitted by conventional arrangements.

To achieve the above object, in accordance with another aspect of the present invention, there is provided a recording and reproducing apparatus which comprises recording and reproducing means for recording and reproducing a video signal on and from a recording medium, modulation means for modulating by a spread spectrum communication method a video signal to be recorded by the recording and reproducing means or a video signal reproduced by the recording and reproducing means, and communication means for transmitting the video signal modulated by the modulation means to an external monitor by wireless communication.

In accordance with another aspect of the present invention, there is provided a recording and reproducing apparatus which integrally comprises recording and reproducing means for recording and reproducing a video signal on and from a recording medium, and communication means for transmitting a video signal to be recorded by the recording and reproducing means or a video signal reproduced by the recording and reproducing means to an external monitor by wireless communication, the communication means being brought to a transmitting state according to a state of operation of the recording and reproducing means.

Still other objects of the present invention, and the advantages thereof, will become fully apparent from the following detailed description of the embodiments.

DETAILED DESCRIPTION OF THE INVENTION

The preferred embodiments of the present invention will be described in detail hereinafter with reference to the accompanying drawings.

Figure 1:
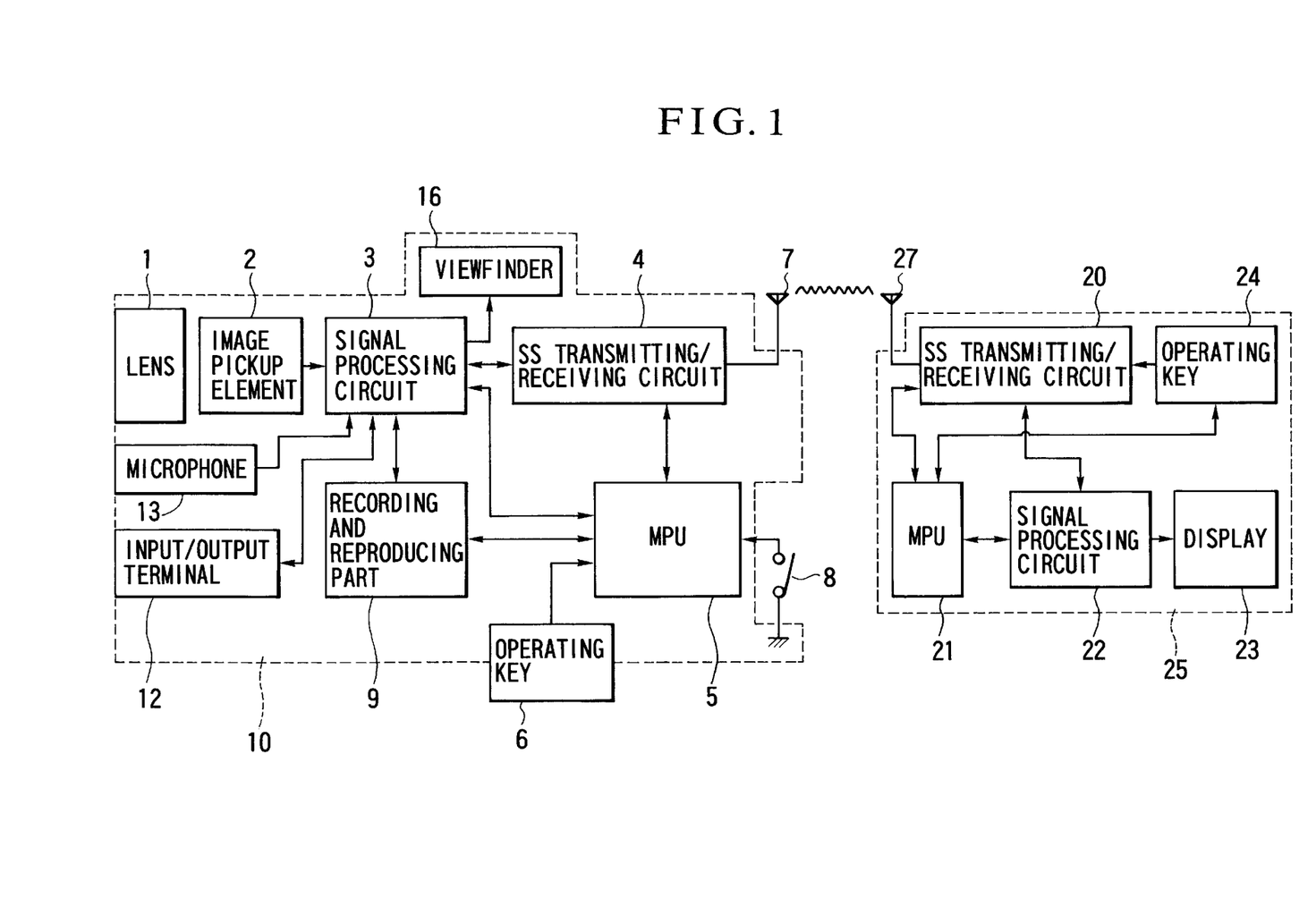
FIG. 1 is a block diagram showing the arrangement of a video system which is composed of a video-camera-integrated type VTR and a monitor device according to one embodiment of the present invention.

FIG. 1 is a block diagram of a video system which is composed of a video-camera-integrated type VTR 10 and a monitor device 25 according to a first embodiment of the present invention. The VTR 10 and the monitor device 25 are capable of communicating signals to each other through spread spectrum communication. Each of the spread spectrum (SS) transmitting/receiving circuit 4 provided in the video-camera-integrated type VTR 10 and the SS transmitting/receiving circuit 20 in the monitor device 25 has the arrangement specifically shown in FIG. 2.

Figure 2:
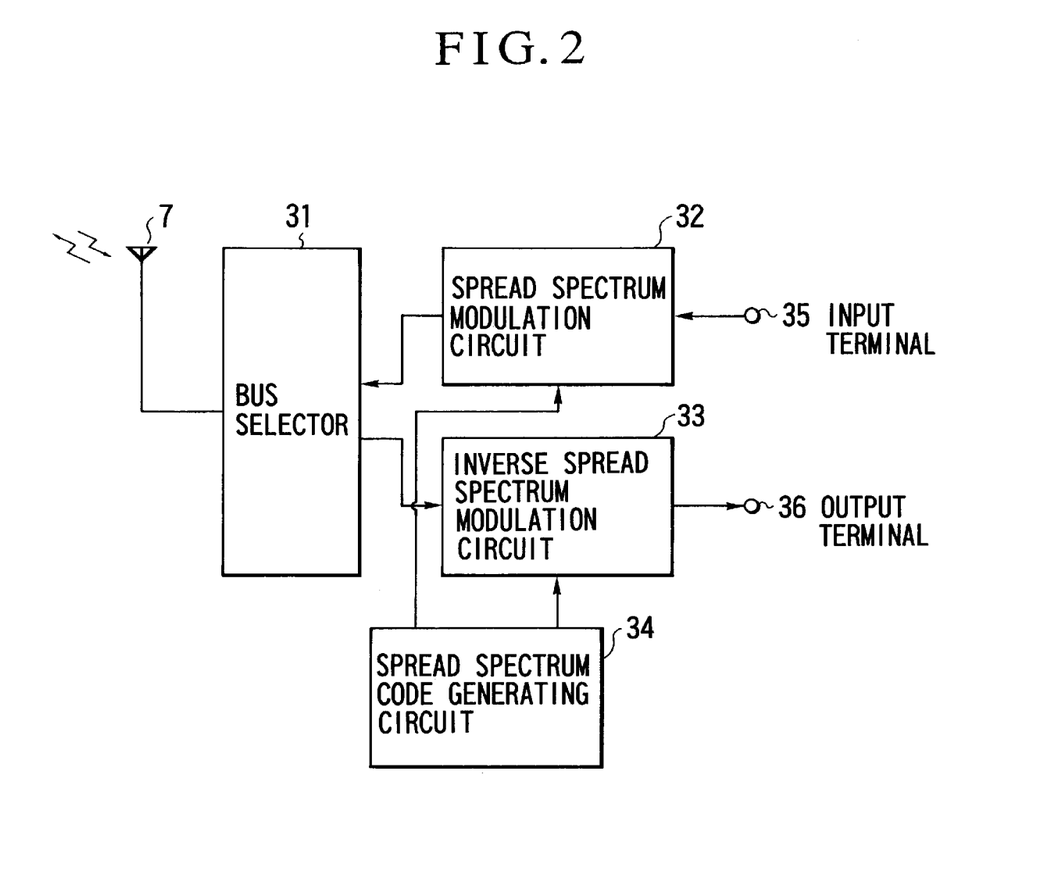
FIG. 2 is a block diagram showing in detail the arrangement of a spread spectrum transmitting/receiving circuit of the video system shown in FIG. 1.

The arrangement shown in FIG. 2 includes a transmitting/receiving antenna 7, a bus selector 31 for selecting a desired mode from among various modes, such as transmission, reception, and transmission and reception, a spread spectrum modulation circuit 32, an inverse spread spectrum modulation circuit 33, a spread spectrum code generating circuit 34, a terminal 35 through which to input data which is to be modulated by the spread spectrum modulation circuit 32 and transmitted from the SS transmitting/receiving circuit 4 (or 20), and a terminal 36 through which to output received data demodulated by the inverse spread spectrum modulation circuit 33.

In the above-described arrangement, if data such as a video signal or an audio signal is to be transmitted, the spread spectrum modulation circuit 32 provided in the SS transmitting/receiving circuit 4 of the VTR 10 performs spread spectrum modulation on the data to be transmitted, in accordance with a code supplied from the spread spectrum code generating circuit 34. The spread-spectrum-modulated data is supplied to the antenna 7 via the bus selector 31, and is then supplied to the monitor device 25 via the antenna 7. Such transmitting operation is approximately the same as a transmitting operation to be performed in the monitor device 25 for the purpose of transmitting operation data which will be described later.

The data received at an antenna 27 of the monitor device 25 is inputted to the bus selector 31 provided in the SS transmitting/receiving circuit 20 of the monitor device 25, and is then inputted to the inverse spread spectrum modulation circuit 33 via the bus selector 31. The inverse spread spectrum modulation circuit 33 performs inverse spread spectrum modulation on the received signal by using a code supplied from the spread spectrum code generating circuit 34, and obtains the original data from the received data. Such receiving operation is approximately the same as a receiving operation to be performed in the VTR 10 for the purpose of receiving operation data which will be described later.

Referring back to FIG. 1, a lens group 1 focuses an optical image on an image pickup element 2, and the image pickup element 2 composed of a CCD or the like converts the optical image into an electrical signal and supplies the electrical signal to a signal processing circuit 3. The signal processing circuit 3 converts the electrical signal received from the image pickup element 2 into a signal format suited to visual display, a signal format suited to communication, or a signal format suited to magnetic recording and reproduction.

After the signal supplied from the image pickup element 2 has been processed by the signal processing circuit 3 and converted into a video signal having the signal format suited to visual display, for example, a format which conforms to a standard television signal format, the video signal is displayed on a viewfinder 16 or the monitor device 25. In the first embodiment, the video signal displayed on the viewfinder 16 and the monitor device 25 is not identical to the video image photographed by the video-camera-integrated type VTR 10 nor the photographed video image recorded by a recording and reproducing part 9. For example, various kinds of auxiliary information relative to photography, such as the date and time of photography, the title of a photographed video image, the remaining amount of battery energy, the remaining amount of tape or the state of operation of the recording and reproducing part 9, are displayed on the viewfinder 16 and the monitor device 25 in such a manner as to be superimposed on the video image being displayed. The signal processing circuit 3 performs processing so that a signal indicative of such auxiliary information relative to photography is added to a video signal. Part of the signal processing circuit 3, i.e., the construction of a portion which superimposes such auxiliary information relative to photography on a video signal, will be described below with reference to the specific example shown in FIG. 6.

Figure 6:
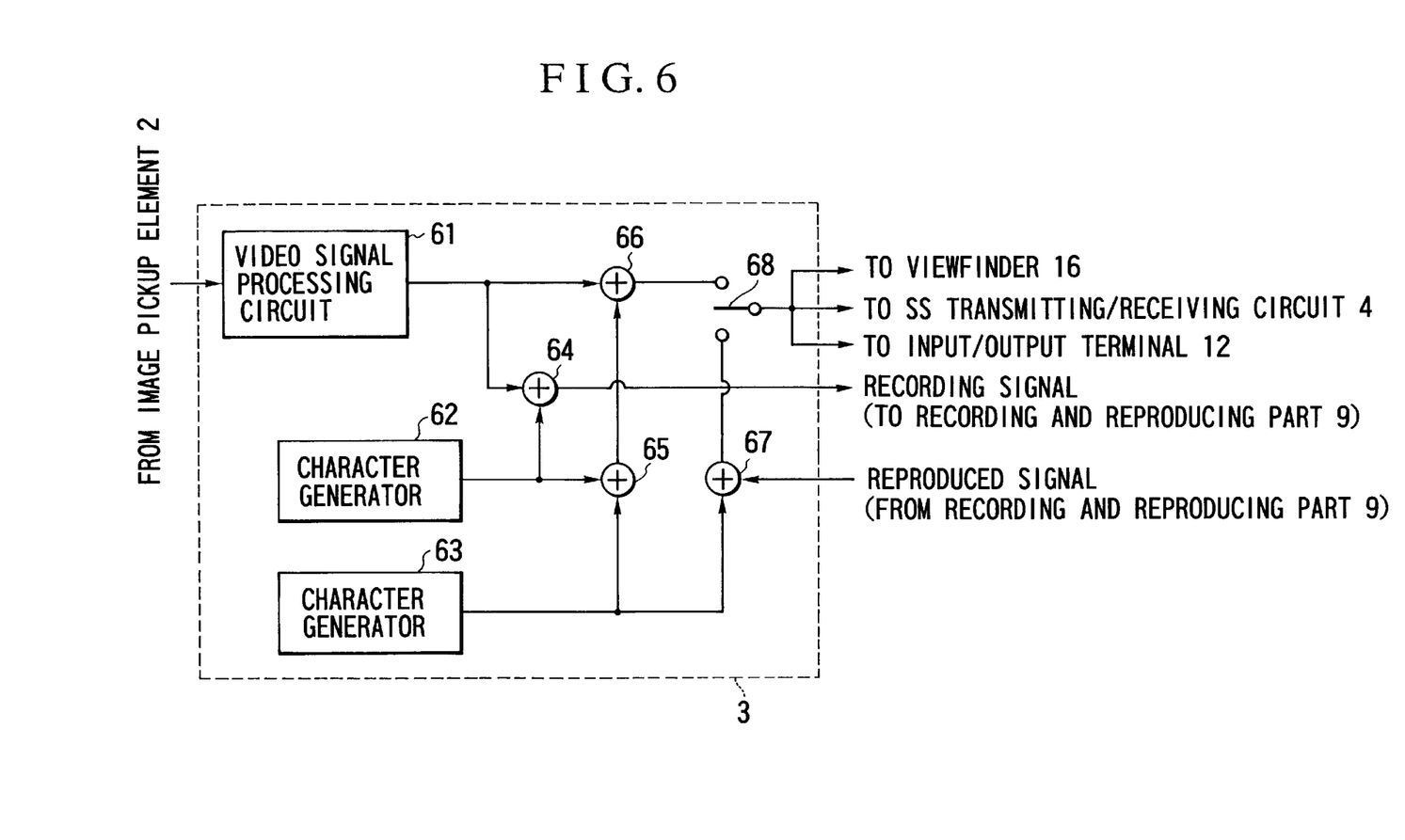
FIG. 6 is a block diagram showing the arrangement of part of the signal processing circuit shown in FIG. 1.

The arrangement shown in FIG. 6 includes a video signal processing circuit 61 for performing the processing of converting the video signal outputted from the image pickup element 2 into a television signal, for example, a standard television signal such as an NTSC signal, a first character generator 62 for generating a signal indicative of auxiliary information, such as the date and time of photography or the title of a photographed video image, to be superimposed on the video signal outputted from the video signal processing circuit 61, a second character generator 63 for generating a signal indicative of various kinds of auxiliary information relative to photography or to recording or reproduction, such as the remaining amount of battery energy, the remaining amount of tape or the state of operation of the recording and reproducing part 9, to be superimposed on the video signal outputted from the video signal processing circuit 61 or the video signal reproduced by the recording and reproducing part 9, and a switch 68 through which to selectively output the video signal supplied from the image pickup element 2 or the video signal reproduced by the recording and reproducing part 9 to the viewfinder 16, the SS transmitting/receiving circuit 4 and an input/output terminal 12.

If a video signal indicative of an image which is being photographed by the video-camera-integrated type VTR 10 is to be selectively outputted to the viewfinder 16, the monitor device 25 and the input/output terminal 12, an adder 65 of the signal processing circuit 3 adds together the various kinds of auxiliary information generated by the first and second character generators 62 and 63, and then an adder 66 adds together the signal outputted from the video signal processing circuit 61 and the output of the adder 65. The result is selectively outputted via the switch 68 to the viewfinder 16, the SS transmitting/receiving circuit 4 and the input/output terminal 12. Incidentally, the video signal outputted to the SS transmitting/receiving circuit 4 is modulated by a spread spectrum communication method and transmitted to the monitor device 25 by wireless communication.

If a video signal indicative of an image which is being photographed by the video-camera-integrated type VTR 10 is to be recorded by the recording and reproducing part 9, an adder 64 adds together the signal outputted from the video signal processing circuit 61 and the signal indicative of the auxiliary information, which is generated by the first character generator 62, and the result is outputted to the recording and reproducing part 9.

If a video signal reproduced by the recording and reproducing part 9 is to be selectively outputted to the viewfinder 16, the monitor device 25 and the input/output terminal 12, an adder 67 adds together the auxiliary information signal generated by the second character generator 63 and the reproduced video signal, and the result is selectively outputted via the switch 68 to the viewfinder 16, the SS transmitting/receiving circuit 4 and the input/output terminal 12.

The signal processing circuit 3 performs, in addition to the aforesaid processing of converting the signal supplied from the image pickup element 2 into the signal format suited to visual display, the processing of converting such signal into the signal format suited to communication and the processing of converting such signal into the signal format suited to magnetic recording and reproduction.

To convert the signal supplied from the image pickup element 2 into the signal format suited to spread spectrum communication, the signal processing circuit 3 digitizes such signal and lowers the data rate thereof by performing band compression using high-efficiency coding or the like, and supplies the obtained digital signal to the SS transmitting/receiving circuit 4. Incidentally, well-known circuits may be employed as a digitizing circuit and a high-efficiency coding circuit.

The processing of converting the signal supplied from the image pickup element 2 into the signal format suited to magnetic recording and reproduction is determined according to the recording and reproduction method adopted in the recording and reproducing part 9. If the recording and reproducing part of a well-known analog VTR is employed, a recording signal is formed by forming a chrominance subcarrier signal and multiplexing the chrominance subcarrier signal onto a low frequency band of a frequency-modulated luminance signal. If the recording and reproducing part of a digital VTR is employed, the signal supplied from the image pickup element 2 is digitized and is then subjected to high-efficiency coding, followed by, for example, the processing of adding an error-correcting parity code to the digital signal.

The VTR 10 shown in FIG. 1 also includes a microprocessing unit (MPU) 5 for controlling each circuit provided in the VTR 10, an operating key 6 for instructing the video-camera-integrated type VTR 10 to perform various operations, a trigger switch 8 for instructing the video-camera-integrated type VTR 10 to start recording, to make it pause, or to perform another operation, the input/output terminal 12 through which to communicate signals to external equipment via a cable (not shown), and a microphone 13. The audio signal picked up by the microphone 13 is inputted to the signal processing circuit 3, which performs the processing of converting the audio signal into a signal format suited to SS communication or into a signal format suited to magnetic recording and reproduction, in a manner similar to that used for processing the video signal outputted from the image pickup element 2.

In the above-described arrangement, the video signal obtained during photography with the video-camera-integrated type VTR 10 is supplied from the image pickup element 2 to the signal processing circuit 3, while the audio signal picked up by the microphone 13 is also supplied to the signal processing circuit 3. The signal processing circuit 3 performs the above-described processing on each of the video signal and the audio signal, and supplies the obtained signals to the required parts, such as the viewfinder 16, the input/output terminal 12, the recording and reproducing part 9 and the SS transmitting/receiving circuit 4. At this time, the operation of a camera part (not shown), for example, a zoom ratio to be selected or a mode to be set, is determined by the MPU 5 in accordance with the operation of each of the operating key 6 and the trigger switch 8. The operation of the recording and reproducing part 9 is also determined by the MPU 5 in accordance with the operation of each of the operating key 6 and the trigger switch 8.

The monitor device 25 includes an MPU 21 for controlling the entire monitor device 25, the SS transmitting/receiving circuit 20, and a signal processing circuit 22. The signal processing circuit 22 decodes the digital video signal received by the SS transmitting/receiving circuit 20, converts it into a signal format suited to visual display on a normal display, such as an NTSC signal format, and supplies the obtained signal to a display 23.

An operating key 24 is provided for controlling the operation of the monitor device 25 and for instructing the video-camera-integrated type VTR 10 to perform various operations. The instruction information inputted from the operating key 24 is supplied to the MPU 21 as well as the SS transmitting/receiving circuit 20, and is transmitted to the video-camera-integrated type VTR 10 via the SS transmitting/receiving circuit 20. In the VTR 10, the SS transmitting/receiving circuit 4 receives the operation (instruction) information inputted from the operating key 24 and supplies it to the MPU 5 so that the MPU 5 can control the operation of the video-camera-integrated type VTR 10.

In the first embodiment, the operation of the video-camera-integrated type VTR 10 which can be controlled by the operating key 24 of the monitor device 25 includes, for example, the operation of selecting a zoom ratio for the camera part (not shown), the operation of setting a mode, and the recording and reproducing operations of the recording and reproducing part 9.

Figure 3:
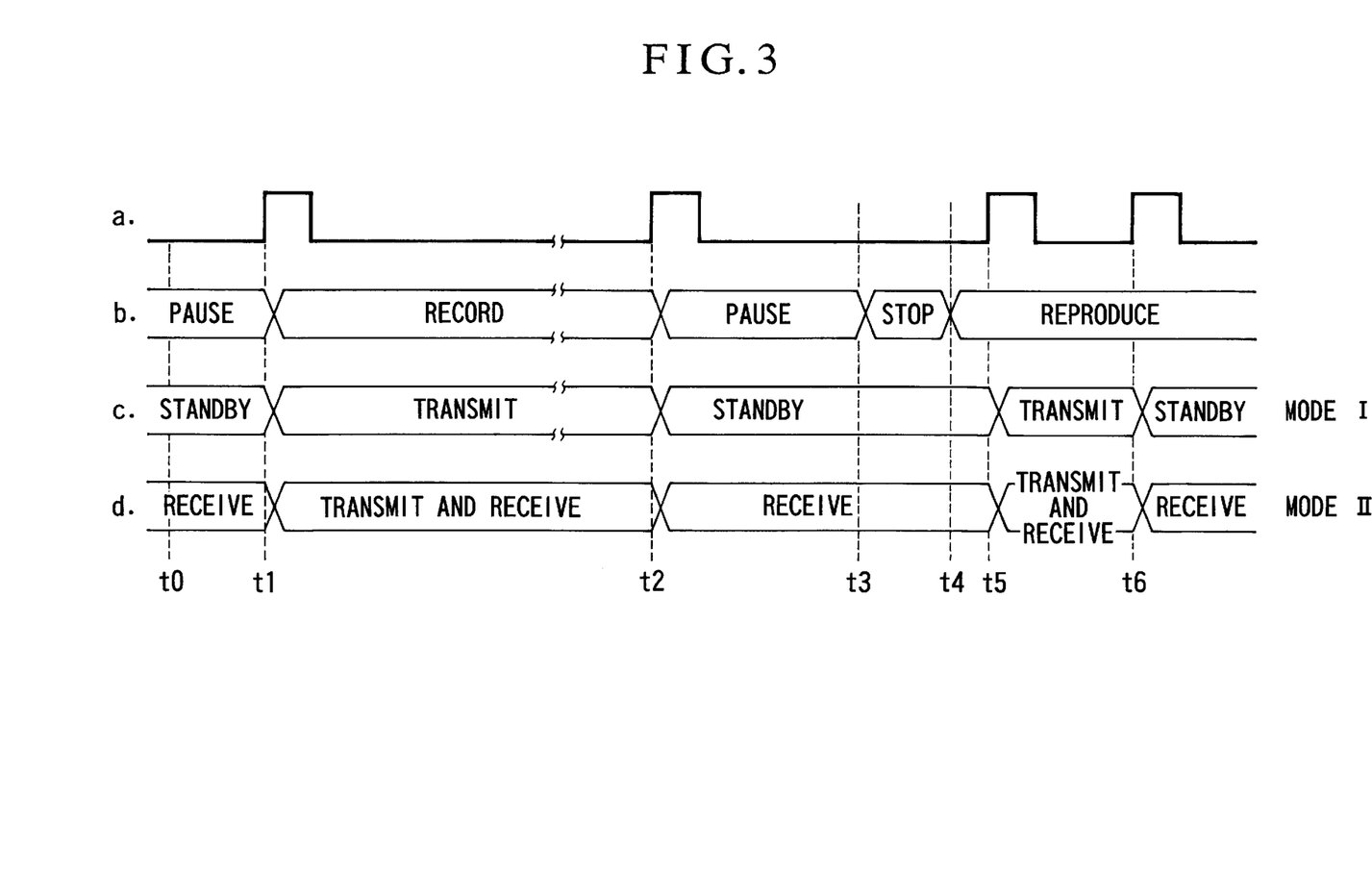
FIG. 3 is a timing chart aiding in describing the operation of the video system shown in FIG. 1.

A further specific operation will be described below sequentially in time with reference to the timing chart shown in FIG. 3. In FIG. 3, Part "a" denotes the state of operation of the trigger switch 8, and each high-level period of Part "a" denotes the period during which the trigger switch 8 is depressed, while each low-level period of Part "a" denotes the period during which the trigger switch 8 is not depressed.

The VTR 10 shown in FIG. 1 has two kinds of modes, i.e., modes I and II, either of which can be selected by the operation of the operating key 6. The mode I is a normal mode in which control of the operation of the VTR 10 is performed on the side of the VTR 10, whereas the mode II is a remote mode in which control of the operation of the VTR 10 is performed on the side of the monitor device 25. Part "b" denotes the state of operation of the recording and reproducing part 9, Part "c" denotes the state of operation of the SS transmitting/receiving circuit 4 in the mode I, and Part "d" denotes the state of operation of the SS transmitting/receiving circuit 4 in the mode II.

First, the operation of the mode I will be described below. It is assumed here that the VTR 10 is in a recording-pause state at a time t0. The recording-pause state is the state in which the image pickup element 2 is in an operating state, while the recording and reproducing part 9 does not perform recording, but can start recording at any time. If the trigger switch 8 is operated at a time t1, the recording and reproducing part 9 starts recording a video signal and an audio signal in a recording mode at the time t1. In synchronism with this operation, the mode of the SS transmitting/receiving circuit 4 switches from a standby state to a transmitting state, and the SS transmitting/receiving circuit 4 transmits a video signal and an audio signal which are being picked up at this time to the monitor device 25 via the antenna 7. The standby state is the state in which the SS transmitting/receiving circuit 4 performs neither transmission nor reception so that its power consumption is minimized. The video signal and the audio signal which have been received by the SS transmitting/receiving circuit 20 of the monitor device 25 are respectively restored to the original signals which are not yet subjected to spread spectrum modulation, by the signal processing circuit 22, and the obtained signals are outputted from the signal processing circuit 22 to the display 23 and a speaker (not shown), respectively.

Then, if the trigger switch 8 is again depressed at a time t2, the signal recording in the recording and reproducing part 9 is made to pause, and the mode of the SS transmitting/receiving circuit 4 returns from the transmitting state to the standby state. After that, if a stop key in the operating key 6 is operated at a time t3, the VTR 10 is brought to a stopped state. The stopped state is the state in which the recording and reproducing part 9 performs neither recording nor reproduction and the image pickup operation of the image pickup element 2 is stopped. In this stopped state, the mode of the SS transmitting/receiving circuit 4 is brought to the standby state irrespective of the operation of the trigger switch 8.

Then, if a reproducing key in the operating key 6 is operated at a time t4, the VTR 10 is set to a reproducing mode, and a video signal and an audio signal recorded on a magnetic tape which is a recording medium are reproduced and supplied to the signal processing circuit 3. Incidentally, in this reproducing mode, the image pickup element 2 does not operate. The signal processing circuit 3 converts the reproduced signal into a signal suited to visual display, such as an NTSC signal, and supplies this signal to the viewfinder 16 and also inputs it to the SS transmitting/receiving circuit 4. If the trigger switch 8 is operated at a time t5 when the VTR 10 is in the reproducing mode, the VTR 10 itself does not change its operation, but the mode of the SS transmitting/receiving circuit 4 switches from the standby state to the transmitting state. Thus, the video signal and the audio signal which have been reproduced by the recording and reproducing part 9 are transmitted to the monitor device 25 via the antenna 7, and are similarly outputted to the display 23 and the speaker. During this state, if the trigger switch 8 is again operated at a time t6, the mode of the SS transmitting/receiving circuit 4 returns to the standby state with the VTR 10 itself remaining in the reproducing mode.

As is apparent from the above description, the mode I is advantageous in terms of power consumption in that the period during which the mode of the SS transmitting/receiving circuit 4 is in the standby state is very long. In addition, the mode I is greatly superior in operability in that no special key operation is needed for bringing the SS transmitting/receiving circuit 4 to the standby state.

The operation of the mode II will be described below. In the mode II, the SS transmitting/receiving circuit 4 is placed in a transmitting/receiving state over the period during which it is placed in the transmitting state in the mode I, whereas the SS transmitting/receiving circuit 4 is placed in a receiving state over the period during which it is placed in the standby state in the mode I. Specifically, in all the periods during which the VTR 10 is operating, the SS transmitting/receiving circuit 4 is placed in the state of being capable of at least receiving the data transmitted from the monitor device 25. In the mode II, if an instruction for the operation of the VTR 10 is inputted from the operating key 24 of the monitor device 25, the VTR 10 can detect the instruction and be remotely operated from the monitor device 25.

The mode II needs slightly larger power consumption than the mode I, but can provide an extremely comfortable operational environment for a user. Specifically, the mode II is very advantageous in that the user can control the video-camera-integrated type VTR 10, particularly, a video camera itself, at a remote location while monitoring an image and sound on the monitor device 25 during actual photography. The first embodiment can provide another great advantage in that since the two modes I and II are prepared in the above-described manner, the user can select either mode in favor of each individual status of use of the video system.

Figure 4:
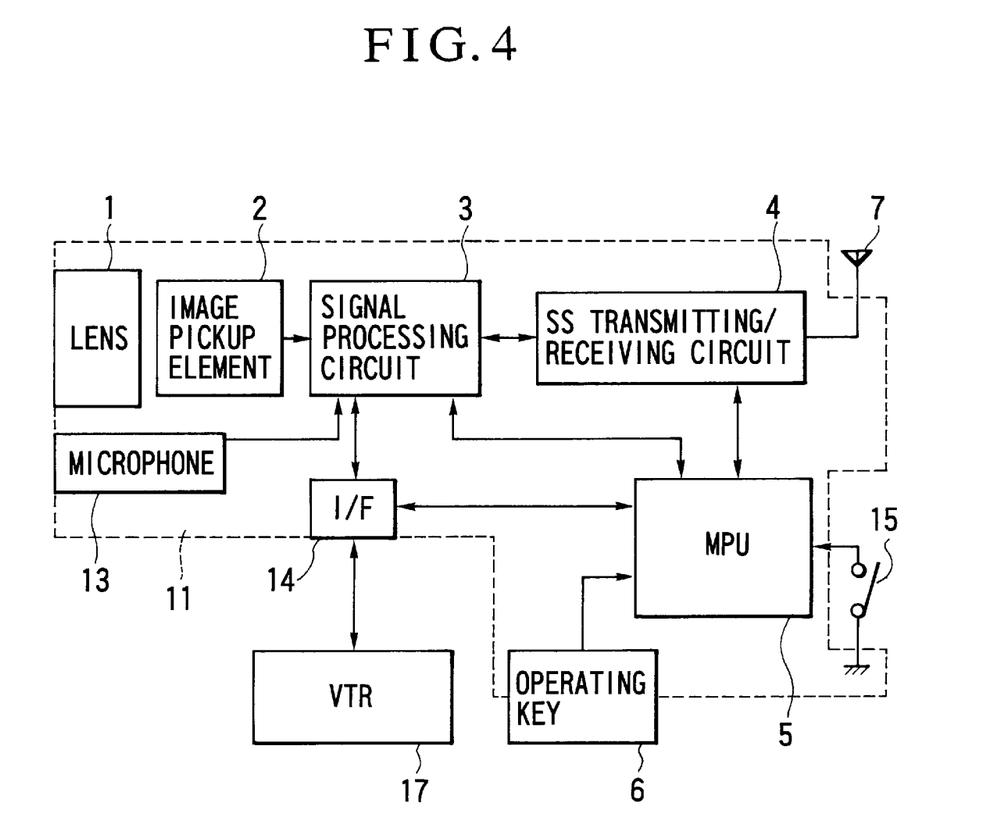
FIG. 4 is a block diagram showing the arrangement of a video system according to another embodiment of the present invention.

A second embodiment of the present invention will be described below with reference to FIGS. 4 and 5. FIG. 4 shows a video system which includes a video camera 11 and a VTR 17 according to the second embodiment of the present invention. In FIG. 4, identical reference numerals are used to denote constituent elements identical to those shown in FIG. 1. Although the monitor device 25 is omitted from the illustration of FIG. 4, a monitor device identical to that shown in FIG. 1 may be employed.

In FIG. 4, reference numeral 14 denotes an interface (I/F) which allows various control signals, such as an operation signal and a mode signal, and information signals, such as a video signal and an audio signal, to be communicated between the video camera 11 and the VTR 17. The interface (I/F) 14 is controlled by the MPU 5. In the video system of the second embodiment, information signals which can be transmitted from the SS transmitting/receiving circuit 4 to the monitor device 25 are a video signal obtained from the image pickup element 2 and an audio signal obtained from the microphone 13, whereas a reproduced video signal obtained from the VTR 17 is incapable of being transmitted from the SS transmitting/receiving circuit 4. The user can control only the operation of the video camera 11, but not control the VTR 17, by employing the operating key 24 of the monitor device 25.

The operation of the video system shown in FIG. 4 will be described below with reference to the timing chart shown in FIG. 5. In FIG. 5, Part "a" denotes the state of operation of the VTR 17, and the state of operation of the VTR 17 is at all times communicated to the MPU 5 via the interface (I/F) 14. Similarly to the SS transmitting/receiving circuit 4 of the first embodiment, the SS transmitting/receiving circuit 4 incorporated in the video system of the second embodiment has the mode I and the mode II which are likewise the power-saving mode and the remote-operation mode, respectively. In FIG. 5, Part "b" denotes the state of the SS transmitting/receiving circuit 4 in the mode I, and Part "c" denotes the state of the SS transmitting/receiving circuit 4 in the mode II.

Figure 5:
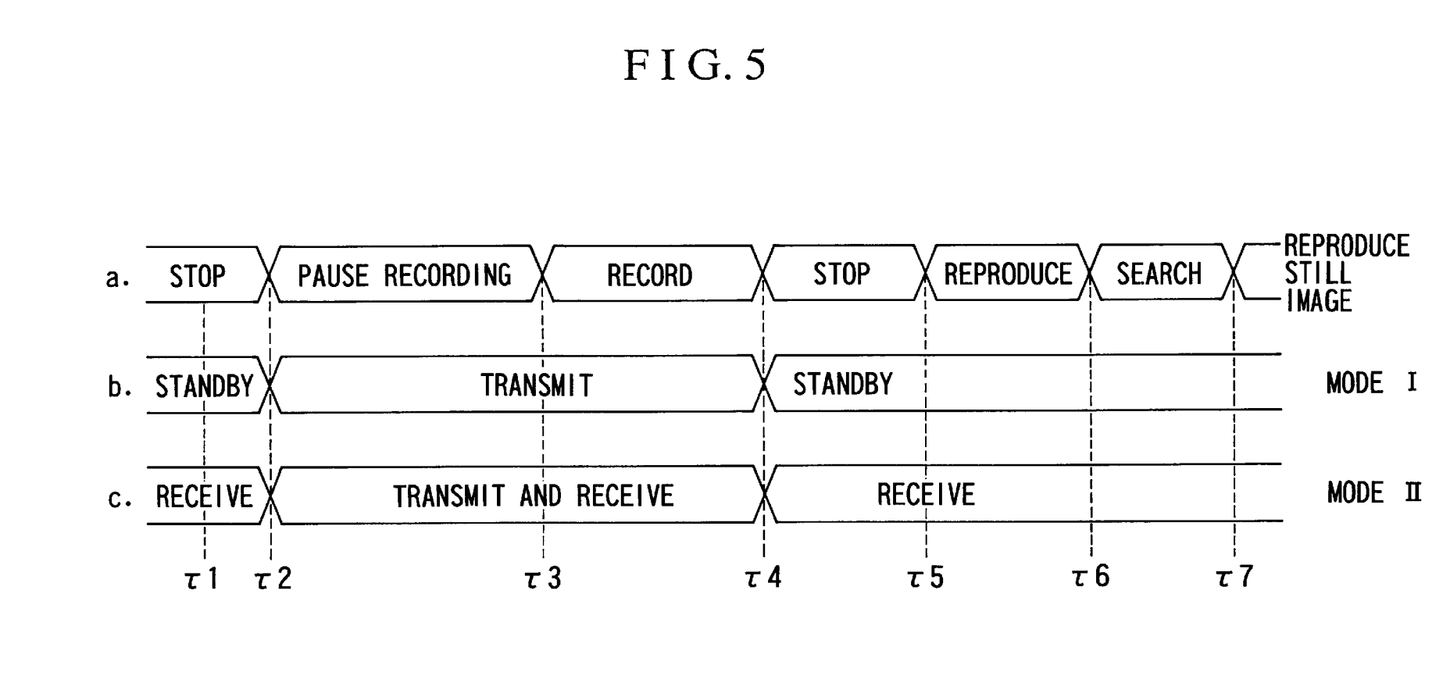
FIG. 5 is a timing chart aiding in describing the operation of the video system shown in FIG. 4.

In order that the user can check what image is being photographed, even during the recording-pause state, the video system of the second embodiment is arranged so that, as is apparent from FIG. 5, while the user is controlling the video camera 11 through the monitor device 25, the image photographed by the video camera 11 is transmitted to the monitor device 25 even during the recording-pause mode, except when the VTR 17 is in the recording mode.

The operation of the SS transmitting/receiving circuit 4 in the mode I will be described below in brief. shown in FIG. 5, if the VTR 17 is in the stopped state at a time $\tau 1$, the SS transmitting/receiving circuit 4 is placed in the aforesaid standby state. Then, if a predetermined key in the operating key 6 is operated at a time $\tau 2$, the MPU 5 brings the video camera 11 to a photographing state and the VTR 17 to the recording-pause state. At this time, the operation of the SS transmitting/receiving circuit 4 changes from the standby state to the transmitting state. After that, at a time $\tau 3$, the VTR 17 starts actual recording in response to the operation of a trigger switch 15, but the operation of the SS transmitting/receiving circuit 4 does not change.

During the recording operation, at a time $\tau 4$, if the VTR 17 is stopped by the operation of the stop key or the like in the operating key 6, the MPU 5 cancels the photographing state of the video camera 11. At this time, the operation of the SS transmitting/receiving circuit 4 changes from the transmitting state to the standby state. Then, at a time $\tau 5$, the MPU 5 brings the VTR 17 to a reproducing state in response to the operation of a reproducing key in the operating key 6, whereas the SS transmitting/receiving circuit 4 is kept in the standby state because neither of the video and audio signals reproduced by the VTR 17 can be transmitted to the monitor device 25. Similarly, at a time $\tau 6$, even if a fast forward key or a rewind key in the operating key 6 is operated to bring the VTR 17 to a high-speed search mode, the SS transmitting/receiving circuit 4 is kept in the standby state. Further, at a time $\tau 7$, even if a still key in the operating key 6 is operated to bring the VTR 17 to a still reproduction mode, the SS transmitting/receiving circuit 4 remains in the standby state.

Regarding the operation of the mode II of the second embodiment, similarly to the first embodiment, the SS transmitting/receiving circuit 4 is placed in the transmitting/receiving state over the period during which it is placed in the transmitting state in the mode I, whereas the SS transmitting/receiving circuit 4 is placed in the receiving state over the period during which it is placed in the standby state in the mode I.

The invention may be embodied in other specific forms without departing from the spirit or essential characteristics thereof.

For example, although in the second embodiment the SS transmitting/receiving circuit 4 is controlled to be placed in the transmitting state at all times when the state of operation of the recording and reproducing part 9 is the recording state or the recording-pause state, the present invention is not limited to this type of control. For example, it is also possible to adopt a mode in which if the user manually operates the operating key 6 or the operating key 24, the SS transmitting/receiving circuit 4 is brought to the transmitting state whatever state may be selected, such as reproduction, search or still reproduction.

Therefore, the above-mentioned embodiments are merely examples in all respects, and must not be construed limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An imaging apparatus, comprising:
   (a) an imaging unit which generates a video signal;
   (b) a recorder which records the video signal outputted from the imaging unit on a recording medium, the recorder being in the imaging apparatus and not in an external apparatus which receives the video signal; and
   (c) a wireless transmitter which automatically starts to transmit the video signal to the external apparatus if the recorder starts to record the video signal.

2. An imaging apparatus according to claim 1, wherein the wireless transmitter automatically stops transmitting the video signal to the external apparatus if the recorder stops recording the video signal.

3. An imaging apparatus according to claim 1, further comprising a wireless receiver which receives data for controlling an operation of said recorder.

4. An imaging apparatus according to claim 1, wherein the wireless transmitter transmits the video signal using a spread spectrum communication.

5. An imaging apparatus according to claim 1, further comprising a superimposer which superimposes auxiliary information on the video signal.

6. An image pickup apparatus according to claim 5, wherein the auxiliary information includes at least one of a date, a title, a remaining amount of a battery, and a remaining amount of the recording medium.

7. A recording apparatus, comprising:
   (a) a recorder which records a video signal on a recording medium, the recorder being in the recording apparatus and not in an external apparatus which receives the video signal; and
   (b) a wireless transmitter which automatically starts to transmit the video signal to said external apparatus if the recorder starts to record the video signal.

8. A recording apparatus according to claim 7, wherein the wireless transmitter automatically stops transmitting the video signal to the external apparatus if the recorder stops recording the video signal.

9. A recording apparatus according to claim 7, further comprising a wireless receiver which receives data for controlling an operation of said recorder.

10. A recording apparatus according to claim 7, wherein said wireless transmitter is a spread spectrum transmitter.

11. A recording apparatus according to claim 7, further comprising a superimposer which superimposes auxiliary information on the video signal.

12. A recording apparatus according to claim 11, wherein the auxiliary information includes at least one of a date, a title, a remaining amount of a battery, and a remaining amount of the recording medium.

* * * * *

UNITED STATES PATENT AND TRADEMARK OFFICE
CERTIFICATE OF CORRECTION

PATENT NO. : 6,480,671 B2
DATED : November 12, 2002
INVENTOR(S) : Takahashi et al.

It is certified that error appears in the above-identified patent and that said Letters Patent is hereby corrected as shown below:

<u>Column 9,</u>
Line 14, delete "." and please insert therefore -- as -- after "brief"

<u>Column 10,</u>
Line 4, insert therefore -- to -- after "construed"

Signed and Sealed this

Twenty-fourth Day of June, 2003

JAMES E. ROGAN
*Director of the United States Patent and Trademark Office*